United States Patent
Yoon et al.

(10) Patent No.: US 8,753,526 B2
(45) Date of Patent: Jun. 17, 2014

(54) POROUS THIN FILM HAVING HOLES AND A PRODUCTION METHOD THEREFOR

(75) Inventors: Kyung Byung Yoon, Seoul (KR); Hyun Sung Kim, Anyang-si (KR); Myunpyo Hong, Seoul (KR); Na Pi Ha, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 0 days.

(21) Appl. No.: 13/817,578

(22) PCT Filed: Aug. 9, 2011

(86) PCT No.: PCT/KR2011/005800
§ 371 (c)(1),
(2), (4) Date: Feb. 19, 2013

(87) PCT Pub. No.: WO2012/023724
PCT Pub. Date: Feb. 23, 2012

(65) Prior Publication Data
US 2013/0149492 A1    Jun. 13, 2013

(30) Foreign Application Priority Data
Aug. 20, 2010    (KR) .................. 10-2010-0080868

(51) Int. Cl.
*B82Y 40/00*    (2011.01)
*B82B 3/00*    (2006.01)

(52) U.S. Cl.
USPC .................. 216/39; 216/42; 216/54; 216/56; 216/67; 216/83; 427/203; 977/882; 977/888; 977/890

(58) Field of Classification Search
None
See application file for complete search history.

(56) References Cited

U.S. PATENT DOCUMENTS

| | | | |
|---|---|---|---|
| 6,042,894 A * | 3/2000 | Goto et al. ................. 427/504 |
| 7,901,727 B2 * | 3/2011 | Hofmann et al. ............ 427/2.1 |
| 2006/0163777 A1 * | 7/2006 | Hirade et al. ........... 264/331.13 |
| 2010/0266656 A1 * | 10/2010 | Johnson ..................... 424/423 |
| 2011/0317160 A1 * | 12/2011 | Li et al. ...................... 356/301 |
| 2012/0058328 A1 * | 3/2012 | Tourvieille et al. ....... 428/315.7 |
| 2012/0100364 A1 * | 4/2012 | Yoon et al. .................. 428/323 |
| 2012/0114920 A1 * | 5/2012 | Yoon et al. .................. 428/204 |

FOREIGN PATENT DOCUMENTS

| | | |
|---|---|---|
| JP | 05-062948 A | 3/1993 |
| JP | 07-302666 A | 11/1995 |
| JP | 2005-136283 A | 5/2005 |
| JP | 2006-107911 A | 5/2006 |

(Continued)

OTHER PUBLICATIONS

Machine Tranalation of KR 10-2009-0076568, Heon Lee, A method for manufacturing nanosphere typed template for nanoimprint, a method for forming nanosphere single layer pattern using the same and an application method using the nanosphere single layer patterh, Jul. 13, 2009, pp. 1-13.*

(Continued)

*Primary Examiner* — Anita Alanko
(74) *Attorney, Agent, or Firm* — Pearne & Gordon LLP

(57) ABSTRACT

The present application relates to a porous thin film having holes, wherein the holes are formed in the top part and/or the bottom part of the thin film and the holes are linked to the pores of the thin film; and the present invention also relates to a production method for a porous thin film having holes, comprising the use of a particle alignment layer as a mold.

13 Claims, 9 Drawing Sheets

(56) References Cited

FOREIGN PATENT DOCUMENTS

| | | |
|---|---|---|
| JP | 2006-135187 A | 5/2006 |
| JP | 2007-073388 A | 3/2007 |
| JP | 2007-269925 A | 10/2007 |
| JP | 2007-311297 A | 11/2007 |
| JP | 2009-117503 A | 5/2009 |
| JP | 2009-152160 A | 7/2009 |
| JP | 2010-504421 A | 2/2010 |
| JP | 2011-233560 A | 11/2011 |
| KR | 10-2005-0001111 A | 1/2005 |
| KR | 10-2005-0014474 A | 2/2005 |
| KR | 10-2009-0076568 A | 7/2009 |

OTHER PUBLICATIONS

International Search Report for PCT/KR2011/005800 dated Mar. 28, 2012.

* cited by examiner

POROUS THIN FILM HAVING HOLES AND A PRODUCTION METHOD THEREFOR

TECHNICAL FIELD

The present disclosure relates to a porous thin film having holes and a production method therefor.

BACKGROUND ART

A porous thin film has pores. With the absorption and separation functions and so on of the pores, the porous thin film can be used in various industrial fields, e.g., lithographic masks, antireflection materials, data-storage materials, catalysts, chemical sensors, functional materials, filters and separation films. Such a porous thin film is required to have regularly aligned pores and possess as many pores as possible.

Conventionally, a porous inorganic thin film has been made by using polystyrene beads and polymer latex in a size of 200 nm to 500 nm, colloid particles and opal particles in a micro size, and the like as a template. However, since pores of the porous inorganic thin film have a micro size or the size of 200 nm to 500 nm, the size of the pores needs to be further reduced.

There are two major methods for making a nano porous thin film. Firstly, once aluminum is anodically oxidized by an anodic oxidation method, regular pores having a several tens of nanometer diameter are formed on a surface of the aluminum. The spacing or the size of the pores can be adjusted through oxidation conditions. Secondly, a nanometer level of a porous structure can be made by microphase separation and self-assembly of a block copolymer. The size or the form of the pores can also be modified by controlling a molecular weight or block composition.

Since the latest porous thin film in a nanometer size has innumerable holes in a controlled (uniformed) size, the porous thin film is useful as a filter. With introduction of the functionality, the porous thin film may be used for separation or purification of a specific material, an enzyme fixture material, and so on.

However, a conventional method for producing a porous thin film uses complicated processes in producing the porous thin film. A size and distribution of pores formed on a produced porous thin film are irregular. Further, it is difficult to adjust the size and alignment of the pores.

DISCLOSURE OF THE INVENTION

Problems to Be Solved by the Invention

The present disclosure provides a method for producing a porous thin film having holes, which includes forming the holes by using a particle alignment layer as a template, and a porous thin film having holes produced by the method.

However, the problems sought to be solved by the present disclosure are not limited to those described above. Other problems, which are sought to be solved by the present disclosure but are not described herein, can be clearly understood by one of ordinary skill in the art from the disclosures below.

Means for Solving the Problems

In accordance with one aspect of the present disclosure, there is provided a method for producing a porous thin film having holes, including: forming a particle alignment layer on a first substrate; contacting the first substrate, on which the particle alignment layer is formed, with a second substrate to transfer the particle alignment layer onto the second substrate; coating the particle alignment layer transferred onto the second substrate with a first thin film formation material to form a particle-first thin film composite; and removing part of the coated first thin film in the particle-first thin film composite to form a multiple number of holes, and then, remove the particles through the holes.

In accordance with another aspect of the present disclosure, there is provided a method for producing a porous thin film having holes, including: preparing a first substrate having a surface, on which a first intaglio or relief is formed; putting a multiple number of particles on the first substrate, and then, inserting parts or all of the particles into pores formed by the first intaglio or relief through a physical pressure to form an alignment layer of the particles on the first substrate; contacting the first substrate, on which the alignment layer of the particles is formed, and with a second substrate with each other to transfer the alignment layer of the particles onto the second substrate; coating the alignment layer of the particles that has been transferred onto the second substrate with a polymer to form a particle-polymer thin film composite; and removing part of the coated polymer in the particle-polymer thin film composite to form a multiple number of holes, and then, remove the particles through the holes.

In accordance with another aspect of the present disclosure, there is provided a method for producing a porous thin film having holes, including: preparing a first substrate having a surface, on which a first intaglio or relief is formed; putting a multiple number of particles on the first substrate, and inserting parts or all of the particles into pores formed by the first intaglio or relief through a physical pressure to form an alignment layer of the particles on the first substrate; preparing a second substrate having a surface, on which an adhesive layer is formed; contacting the first substrate, on which the alignment layer of the particles is formed, and with the adhesive layer of the second substrate with each other to transfer the alignment layer of the particles onto the second substrate; coating the alignment layer of the particles that has been transferred onto the second substrate with a polymer to form a particle-polymer thin film composite; removing the adhesive layer formed on the second substrate to separate the particle-polymer thin film composite thereby forming holes enabling parts of the particles to be exposed to in a bottom part of the particle-polymer thin film composite, and then, transferring the particle-polymer composite thin film onto a third substrate so as to make contact the holes in contact with a surface of the third substrate; and removing part of the polymer coated on a top part of the particle-polymer thin film composite to form a multiple number of holes, and then, remove the particles through the holes.

In accordance with another aspect of the present disclosure, there is provided a porous thin film having holes, wherein the holes are formed in a top part and/or a bottom part of the thin film and penetrate the pores of the thin film.

Effect of the Invention

In accordance with an illustrative embodiment of the present disclosure, there are provided a porous thin film having holes and a method for producing the same. In producing the porous thin film having holes, a particle alignment layer, which can be formed under the condition that no solvent is used, and accurate adjustment of a temperature and moisture is unnecessary, is used as a template. Accordingly, the porous thin film having holes can be produced within a short time through a simple method. Furthermore, a porous thin film having large-size holes can be produced. In forming the particle alignment layer useful as a template, a size of pores of the porous thin film having holes can be variously adjusted by adjusting a size of the particles. Also, a shape, size and/or alignment of the holes can be variously adjusted. By using the absorption and separation functions and so on of the pores, the porous thin film having holes can be applied to various technical fields, e.g., lithographic masks, antireflection materials, data-storage materials, catalysts, chemical sensors, functional materials, filters and separation films.

BEST MODE FOR CARRYING OUT THE INVENTION

Figure 1:
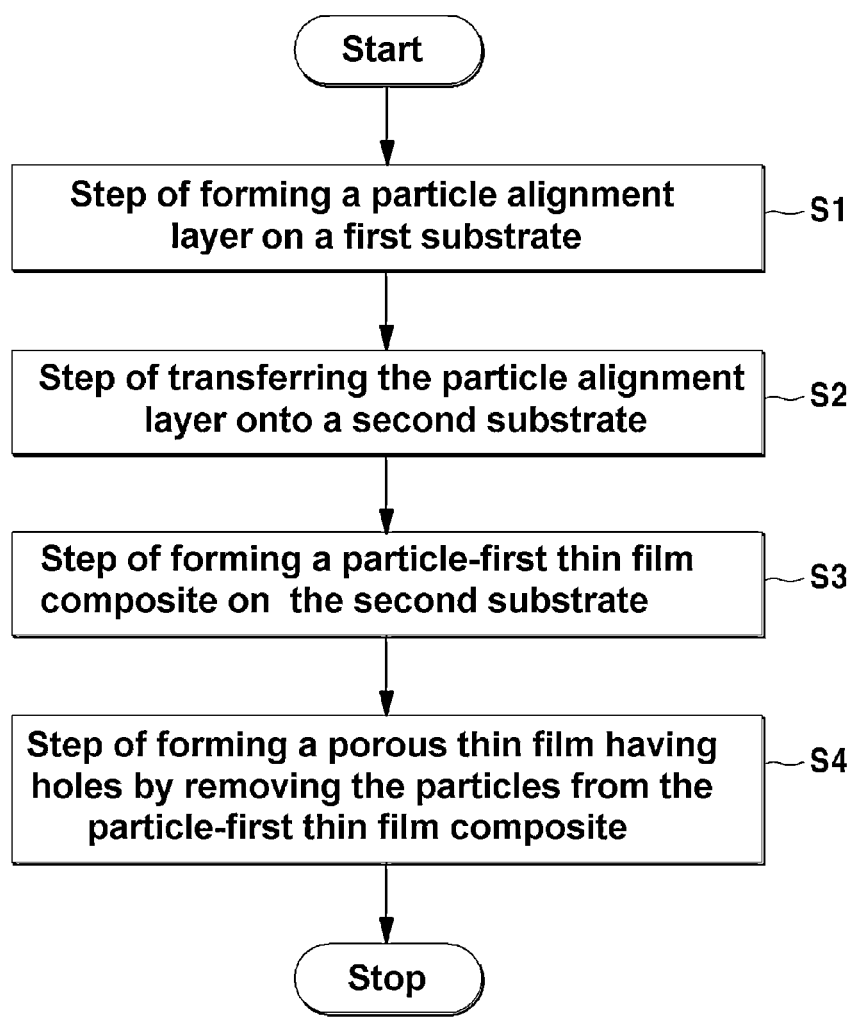
FIG. 1 is a flow chart for explanation of a method for producing a porous thin film having holes in accordance with an illustrative embodiment of the present disclosure.

Hereinafter, illustrative embodiments and examples of the present disclosure will be described in detail with reference to the accompanying drawings so that inventive concept may be readily implemented by those skilled in the art.

However, it is to be noted that the present disclosure is not limited to the illustrative embodiments and the examples but can be realized in various other ways. In the drawings, certain parts not directly relevant to the description are omitted to enhance the clarity of the drawings, and like reference numerals denote like parts throughout the whole document.

Throughout the document, the term "comprises or includes" and/or "comprising or including" used in the document means that one or more other components, steps, operation and/or existence or addition of elements are not excluded in addition to the described components, steps, operation and/or elements unless context dictates otherwise. Throughout the document, the term "step of" does not mean "step for."

Throughout the document, the term "on" that is used to designate a position of one element with respect to another element includes both a case that the one element is adjacent to the another element and a case that any other element exists between these two elements. Further, the term "comprises or includes" and/or "comprising or including" used in the document means that one or more other components, steps, operation and/or existence or addition of elements are not excluded in addition to the described components, steps, operation and/or elements unless context dictates otherwise.

The terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party.

The "holes" in the document mean holes formed in a top part and/or a bottom part of a porous thin film having holes in accordance with an illustrative embodiment of the present disclosure. The "holes" may be linked to pores of the thin film. A shape and/or a size of the holes can be variously adjusted, irrespective of a structure and a form of the pores of the thin film. For example, the size of the holes can be variously adjusted in the scope of the nanometer to micrometer size.

In accordance with one aspect of the present disclosure, there is provided a method for producing a porous thin film having holes, including: forming a particle alignment layer on a first substrate; contacting the first substrate, on which the particle alignment layer is formed, with a second substrate to transfer the particle alignment layer onto the second substrate; coating the particle alignment layer transferred onto the second substrate with a first thin film formation material to form a particle-first thin film composite; and removing part of the coated first thin film in the particle-first thin film composite to form a multiple number of holes, and then, remove the particles through the holes.

In an illustrative embodiment of the present disclosure, the method for producing a porous thin film having holes may further include forming a porous multilayer thin film having holes by forming a multiple number of porous thin films having holes through repetition of the above-described processes, and then, stacking the thin films. However, the present disclosure is not limited thereto. In an illustrative embodiment, sizes and alignments of the holes in each of the thin films forming the porous multilayer thin film may be identical to or different from one another, but the present disclosure is not limited thereto.

In an illustrative embodiment of the present disclosure, the size of the holes may be smaller than the size of the particles, but the present disclosure is not limited thereto. The size of the holes can be variously adjusted, for example, in the scope of the nanometer to micrometer size.

In an illustrative embodiment of the present disclosure, the holes may be, but not limited to, two-dimensionally and regularly arranged.

In an illustrative embodiment of the present disclosure, the size of the particles may be in the nanometer to micrometer scope, for example, 1 nm to 10000 μm, 5 nm to 10000 μm, 10 nm to 10000 μm, 1 nm to 1000 μm, 5 nm to 1000 μm, 10 nm to 1000 μm, 1 nm to 100 μm, 5 nm to 10000 μm, or 10 nm to 100 μm, but the present disclosure is not limited thereto.

In an illustrative embodiment of the present disclosure, the particle alignment layer may include, but not limited to, a monolayer or a multilayer of the particles.

In an illustrative embodiment of the present disclosure, the step of removing the particles may include, but not limited to, forming a multiple number of holes by etching part of the first thin film to expose part of each of the particles through the holes; and removing the exposed particles through the holes. For example, etching part of the first thin film may use a proper etching solution capable of selectively etching the first thin film or a plasma etching method, but the present disclosure is not limited thereto.

In an illustrative embodiment of the present disclosure, the first substrate may have, but not limited to, a pattern of a first intaglio or a first relief formed on a surface thereof. The pattern of the first intaglio or relief formed on the first substrate may be carved directly on the substrate itself through lithography, laser beams, etching and the like, or formed by positive or negative photoresist, or formed by laser ablation after coating of a sacrificial layer, or formed by inkjet printing, but the present disclosure is not limited thereto.

In an illustrative embodiment of the present disclosure, the pores formed by the first intaglio or relief formed on the first substrate may include, but not limited to, a form of a nanowell, a nanodot, a nanorod, a nanocolumn, a nanotrench, or a nanocone. For example, the pores formed by the first intaglio or the cross section of the form of the first relief may be, but not limited to, in various geometrical forms including polygons such as a circle, a trigon, a tetragon, a pentagon, a hexagon, a heptagon, an octagon, a nonagon, a decagon, a trapezoid, a diamond and a parallelogram, complex figures such as an oval, a semicircle, a crescent moon, a flower shape and a star shape, and a straight or curved trench. According to the present disclosure, regardless of the shape of the pores formed by the first intaglio or relief, the particles can be inserted into almost all of the pores and completely aligned.

In an illustrative embodiment, the pores formed by the first intaglio or relief formed on the first substrate may have, but not limited to, one or at least two sizes and/or shapes. According to the present disclosure, a multiple number of particles are inserted into the pores through a physical pressure, without using self-assembly of the particles in a solvent. Therefore, even though the pores on the first substrate have at least two sizes and/or shapes, the particles can be inserted into almost all of the pores. In this case, the particles having different sizes and/or shapes are inserted into the pores, such that the porous thin film having holes produced by using the particle alignment layer as a template can have the pores in different sizes and/or shapes. In another illustrative embodiment, the first substrate may form at least two second intaglios that can fix positions and/or orientations of further respective particles in the first intaglio. In this case, the second intaglio capable of fixing the positions and/or the orientations of the particles may have one or at least two sizes and/or shapes, but the present disclosure is not limited thereto.

The size of the respective pores formed by the first intaglio or the first relief may be, but not limited to, 1 nm to 10000 μm, 5 nm to 10000 μm, 10 nm to 10000 μm, 1 nm to 1000 μm, 5 nm to 1000 μm, 10 nm to 1000 μm, 1 nm to 100 μm, 5 nm to 100 μm, or 10 nm to 100 μm. In the present disclosure, in case of the nanowell or the nanocolumn, the size of the respective pores formed by the first intaglio or the first relief means a diameter of the nanowell or the nanocolumn. In case of the nanocone, the size of respective pores formed by the first intaglio or relief means a diameter of a bottom part of the nanocone. In an illustrative embodiment, depth/height of the respective pores may be 1 nm to 10000 μm, 5 nm to 10000 μm, 10 nm to 10000 μm, 1 nm to 1000 μm, 5 nm to 1000 μm, 10 nm to 1000 μm, 1 nm to 100 μm, 5 nm to 100 μm, or nm to 100 μm. The bottom of the respective pores may be flat, gently inclined, or curved.

In an illustrative embodiment of the present disclosure, the physical pressure may be applied through rubbing or pressing against the substrate, but the present disclosure is not limited thereto. In another illustrative embodiment, the rubbing may include performing reciprocation movement at least one time in a direction parallel with the first substrate in the state that a physical pressure is applied to the particles put on the first substrate by using a first member. However, the present disclosure is not limited thereto. If necessary, the method for producing the porous thin film having holes may further include removing remaining particles other than the particles forming the alignment layer by using a second substrate coated with an adhesive material, after the rubbing.

In an illustrative embodiment of the present disclosure, if the first substrate has the pattern of the first intaglio or relief formed on a surface thereof, the step of forming the particle alignment layer on the first substrate may include, but not limited to, putting a multiple number of particles on the first substrate, and then, inserting parts or all of the particles into the pores formed by the first intaglio or the first relief through a physical pressure to form the particle alignment layer on the first substrate.

In an illustrative embodiment of the present disclosure, the pores formed by the first intaglio or relief formed on the first substrate may have, but not limited to, a shape corresponding to the shape of the certain parts of the particles inserted into the pores for adjustment of the orientation of the particles.

In an illustrative embodiment of the present disclosure, the method for producing a porous thin film having holes may further include, but not limited to, forming an adhesive layer on the surface of the second substrate, prior to contacting the first substrate with the second substrate.

In an illustrative embodiment of the present disclosure, the method for producing a porous thin film having holes may further include, but not limited to, forming an adhesive layer on the first substrate, prior to forming the particle alignment layer on the first substrate.

The adhesive layer may include, but not limited to, a compound selected from the group consisting of (i) a compound having a —NH$_2$ group, (ii) a compound having a —SH group, (iii) a compound having a —OH group, (iv) polymer electrolyte, (v) polystyrene, (vi) photoresist, and a combination thereof. If the adhesive layer is formed by coating the surface of the first substrate with an adhesive material, free-standing particle alignment and pattern can be formed on the first flat substrate, by assigning a first or second intaglio to the adhesive material coated on the first substrate in a desired alignment and pattern type by a simple process for a short time, inserting the particles into the pores formed by the first or second intaglio by using a physical pressure to dispose the pores in the above-described alignment and pattern type, and then, removing the adhesive material.

In an illustrative embodiment of the present disclosure, the method for producing a porous thin film having holes may further include, but not limited to, separating the formed porous thin film having holes from the second substrate. In that case, the porous thin film having the holes that has been separated from the second substrate may be transferred to a support substrate having larger holes than the holes of the porous thin film.

In an illustrative embodiment of the present disclosure, after the formation of the first thin film, at least one additional thin film may be formed, but not limited to, on the first thin film. For example, the material for the formation of the first thin film may be identical to or different from the material for the formation of the further thin film, but the present disclosure is not limited thereto.

In an illustrative embodiment of the present disclosure, the first or second substrate is a solid phase substrate. As the first or second substrate, any solid phase substrate known in the art of the present disclosure can be used. For example, the first or second substrate may include, but not limited to, glass, a fused silica wafer, a silicon wafer or a substrate coated with photoresist. In an illustrative embodiment, the substrate may be a substrate coated with photoresist (PR). As the photoresist, any photoresist known in the art of the present disclosure can be used without limitation. A positive or negative photoresist may be used. An unlimited example for the photoresist may include PDMS, polymethylmethacrylate (PMMA), polymethylglutarimide (PMGI), DNQ/Novolac, and SU-8. The photoresists described in U.S. Pat. Nos. 5,492,793; 5,747,622; 5,468,589; 4,491,628; 5,679,495; 6,379,861, 6,329,125; 5,206,317; 6,146,793; 6,165,682; 6,340,734; 6,028,154; 6,042,989; 5,882,844; 5,691,396; 5,731,126; 5,985,524; 6,531,260; and 6,590,010 may be used, but the present disclosure is not limited thereto.

In another illustrative embodiment, the substrate may be an oxide containing one or at least two of various metal such as silicon, aluminum, titan, tin and indium and non-metal elements, and may include any material having a hydroxyl group on a surface thereof, e.g., various conductive glasses such as quartz, mica, glass, ITO glass (glass on which an indium tin oxide is deposited) and tin oxide ($SnO_2$), fused silica, amorphous silica, porous silica, alumina, porous alumina, crystal, sapphire, titanium dioxide, porous titanium dioxide and a silicon wafer, but the present disclosure is not limited thereto. In another illustrative embodiment, the substrate may be, but not limited to, a metal combined with a thiol (—SH) group or an amine (—$NH_2$) group such as gold, silver, copper and platinum, or metals such as nickel and stainless steel. In another illustrative embodiment, the substrate may include a polymer having various functional groups on the surface thereof, e.g., polyvinyl chloride (PVC) having a functional group on a surface thereof, merrifield peptide resin, polystyrene, polyester, polydimethylsiloxane (PDMS), positive or negative photoresist (PR), poly(methyl methacrylate) (PMMA) and acryl. Also, the substrate may include a semiconductor such as zinc selenide (ZnSe), gallium arsenide (GaAs), and indium phosphide (InP). However, the present disclosure is not limited thereto. In another illustrative embodiment, the substrate may include, but not limited to, a natural polymer, a synthetic polymer or a conductive polymer, having a hydroxyl group on a surface thereof, such as natural or synthetic zeolite and its analogous porous molecular sieve, cellulose, starch (amylose and amylopectin) and lignin A surface area of the first or second substrate is not specifically limited. In case of using the above-described particle alignment method, the method can be applied to a substrate having a large surface area so that all the particles can be completely aligned over the whole surface area.

In an illustrative embodiment of the present disclosure, the particles aligned on the first substrate may be contacted with or spaced from adjacent particles, but the present disclosure is not limited thereto. For example, the present disclosure enables the particles inserted into the pores to be contacted with or spaced from adjacent particles, by adjusting a distance between the pores of the first substrate. As a result, particle alignment having a close packed or non-close packed structure can be formed. Furthermore, the present disclosure can optionally align the particles in orthorhombic close alignment, hexagonal close alignment or others, by adjusting positions of the respective pores of the first substrate. For example, the shortest distance between two facing points of the cross sections of the pores may be, but not limited to, 2 nm to 1000 nm.

Meanwhile, according to the present disclosure, the particles inserted into the pores on the first substrate are collected such that a certain pattern or shape of 1D, 2D and 3D can be formed. As an unlimited example, a one-dimensional pattern such as 1D wires and 1D stripes, a two-dimensional pattern such as 2D square net alignment, and a three-dimensional pattern similar to a crystal lattice structure can be formed. In this case, the particles formed on the first substrate may have one or at least two patterns or shapes. A size of the pattern formed by the particles is not limited and may be 1 mm to 15 cm, 5 mm to 5 cm, or 8 mm to 2 cm (in length/width/height). According to the present disclosure, the particles may be disposed on the substrate in fcc (100) alignment, fcc (111) alignment or a combination thereof. That is, the present disclosure can dispose the particles on one substrate in an identical alignment or at least two alignments having different symmetry at the same time.

In an illustrative embodiment of the present disclosure, the particles may be selected from the group consisting of an organic polymer, an inorganic polymer, an inorganic material, metal particles, a magnetic material, a semiconductor, a biomaterial, and a combination thereof, but the present disclosure is not limited thereto.

An unlimited example for the organic polymer may include, but not limited to, polystyrene, polymethylmethacrylate (PMMA), polyacrylate, polyalphamethylstylene, polybenzylmethacrylate, polyphenylmethacrylate, polydiphenylmethacrylate, polycyclohexylmethacrylate, a styrene-acrylonitrile copolymer, a styrene-methylmethacrylate copolymer and so on. An unlimited example for the inorganic polymer may include, but not limited to, titanium oxide, zinc oxide, cerium oxide, tin oxide, thallium oxide, barium oxide, aluminum oxide, yttrium oxide, zirconium oxide, copper oxide, nickel oxide, silica and so on. An unlimited example for the metal particles may include, but not limited to, gold, silver, copper, platinum, aluminum, zinc, cerium, thallium, barium, yttrium, zirconium, tin, titanium, cadmium, iron, or an alloy thereof and so on. An unlimited example for the semiconductor particles may include a single element semiconductor (e.g., Si and Ge) and a compound semiconductor (e.g., AlP, AlAs, AlSb, GaN, GaP, GaAs, GaSb, InP, InAs and InSb). However, the present disclosure is not limited thereto. Another unlimited example for the particles may include crystalline and non-crystalline, binary and multicomponent main group metal and transition metal chalcogenides such as $SiO_2$, $TiO_2$, indium tin oxide (ITO) and $Al_2O_3$; a material, in which among the above-described materials, at least two materials are in a core/shell or core/first shell/second shell form or various forms; a fluorescent core material and a shell of various materials enclosing the core material; a material, in which at least two materials form multiple layers like an onion; a fluorescent material, in which organic, inorganic, or organic and inorganic fluorescent molecules are regularly or irregularly distributed in organic and inorganic particles; and particles having a magnetic, diamagnetic, paramagnetic, ferroelectric, ferroelectric, superconductive, conductive, semiconductor, or nonconductor property. An unlimited example for the biomaterial includes protein, peptide, DNA, RNA, polysaccharide, oligosaccharide, lipid, cells, and a composite thereof.

In an illustrative embodiment of the present disclosure, the particles may be, but not limited to, porous or nonporous.

In an illustrative embodiment of the present disclosure, the particles may be symmetric, asymmetric or amorphous. An unlimited shape of the particles may include a globular shape, a semispherical shape, a cube shape, a tetrahedral shape, a pentahedral shape, a hexahedral shape, a rectangular parallelepiped shape, an octahedral shape, a Y shape, a column shape and a cone shape. However, the present disclosure is not limited thereto. The particles may be in a continuously curved shape having no flat facet. Preferably, the particles may be in a globular shape.

In an illustrative embodiment of the present disclosure, the first substrate and the particles form a hydrogen bond, an ionic bond, a covalent bond, a coordinate bond, or a van der waals bond By applying a physical pressure, but the present disclosure is not limited thereto.

In an illustrative embodiment of the present disclosure, the thin film may include, but not limited to, an organic thin film, an inorganic thin film or an organic-inorganic hybrid thin film.

For example, the organic thin film may include, but not limited to, at least one selected from the group consisting of polystyrene, polymethylmethacrylate (PMMA), polyacrylate, polyalphamethylstylene, polybenzylmethacrylate, polyphenylmethacrylate, polydiphenylmethacrylate, polycyclohexylmethacrylate, stylene-acrylonitrile copolymer, and stylene-methylmethacrylate copolymer.

The inorganic thin film may be formed by using an inorganic material that is useful for coating and known in the art of the present disclosure. For example, the above-described exemplary materials for the inorganic polymer, the inorganic material, the metal particles, the magnetic material, the semiconductor and so on may be used. However, the present disclosure is not limited thereto.

The organic-inorganic hybrid thin film may be formed by properly combining the above-described exemplary materials for the organic thin film and the inorganic thin film, but the present disclosure is not limited thereto.

In accordance with another aspect of the present disclosure, there is provided a method for producing a porous thin film having holes, including:

preparing a first substrate having a surface, on which a first intaglio or relief is formed;

putting a multiple number of particles on the first substrate, and then, inserting parts or all of the particles into pores formed by the first intaglio or relief through a physical pressure to form an alignment layer of the particles on the first substrate;

contacting the first substrate, on which the alignment layer of the particles is formed, with a second substrate to transfer the alignment layer of the particles onto the second substrate;

coating the alignment layer of the particles that has been transferred onto the second substrate with a polymer to form a particle-polymer thin film composite; and removing part of the coated polymer in the particle-polymer thin film composite to form a multiple number of holes, and then, remove the particles through the holes.

In accordance with another aspect of the present disclosure, there is provided a method for producing a porous thin film having holes, including:

preparing a first substrate having a surface, on which a first intaglio or relief is formed;

putting a multiple number of particles on the first substrate, and inserting parts or all of the particles into pores formed by the first intaglio or relief through a physical pressure to form an alignment layer of the particles on the first substrate;

preparing a second substrate having a surface, on which an adhesive layer is formed;

contacting the first substrate, on which the alignment layer of the particles is formed, with the adhesive layer of the second substrate to transfer the alignment layer of the particles onto the second substrate;

coating the alignment layer of the particles that has been transferred onto the second substrate with a polymer to form a particle-polymer thin film composite;

removing the adhesive layer formed on the second substrate to separate the particle-polymer thin film composite thereby forming holes enabling parts of the particles to be exposed in a bottom part of the particle-polymer thin film composite, and then, transferring the particle-polymer composite thin film onto a third substrate so as to contact the holes with a surface of the third substrate; and removing part of the polymer coated on a top part of the particle-polymer thin film composite to form a multiple number of holes, and then, remove the particles through the holes.

In accordance with another aspect of the present disclosure, there is provided a porous thin film having holes, wherein the holes are formed in a top part and/or a bottom part of the thin film and penetrate the pores of the thin film.

In an illustrative embodiment of the present disclosure, the holes may be, but not limited to, two-dimensionally and regularly aligned.

In an illustrative embodiment of the present disclosure, the thin film may include, but not limited to, an organic thin film, an inorganic thin film or an organic-inorganic hybrid thin film.

In an illustrative embodiment of the present disclosure, the size of the holes may be, but not limited to, smaller than the size of the pores of the thin film.

In an illustrative embodiment of the present disclosure, the size of the pores of the thin film may be, but not limited to, 1 nm to 10000 μm, 5 nm to 10000 μm, 10 nm to 10000 μm, 1 nm to 1000 μm, 5 nm to 1000 μm, 10 nm to 1000 μm, 1 nm to 100 μm, 5 nm to 100 μm, or 10 nm to 100 μm.

In an illustrative embodiment of the present disclosure, the porous thin film having holes may have, but not limited to, at least two pores in different sizes.

In an illustrative embodiment of the present disclosure, the thin film may be a porous multilayer thin film having holes, in which the two porous thin films having holes are stacked each other, but the present disclosure is not limited thereto. In an illustrative embodiment, the holes of the porous multilayer thin film may penetrate through one another, but the present disclosure is not limited thereto. In another illustrative embodiment, shapes and/or sizes of the holes of the respective thin films in the porous multilayer thin film having holes may be identical to or different from one another.

Hereinafter, a thin film having regularly aligned holes and a method for producing the same in accordance with illustrative embodiments and examples of the present disclosure will be explained in detail with reference to the drawings.

With reference to FIG. 1, the method for producing a porous thin film having holes in accordance with the present disclosure may include: forming a particle alignment layer on a first substrate (S1); contacting the first substrate, on which the particle alignment layer is formed, with a second substrate to transfer the particle alignment layer onto the second substrate (S2); coating the particle alignment layer that has been transferred onto the second substrate with a first thin film formation material to form a particle-first thin film composite (S3); and removing part of the first thin film coated on the particle alignment layer to form a multiple number of holes, and then, remove the particles through the holes (S4). However, the present disclosure is not limited thereto.

Figure 2:
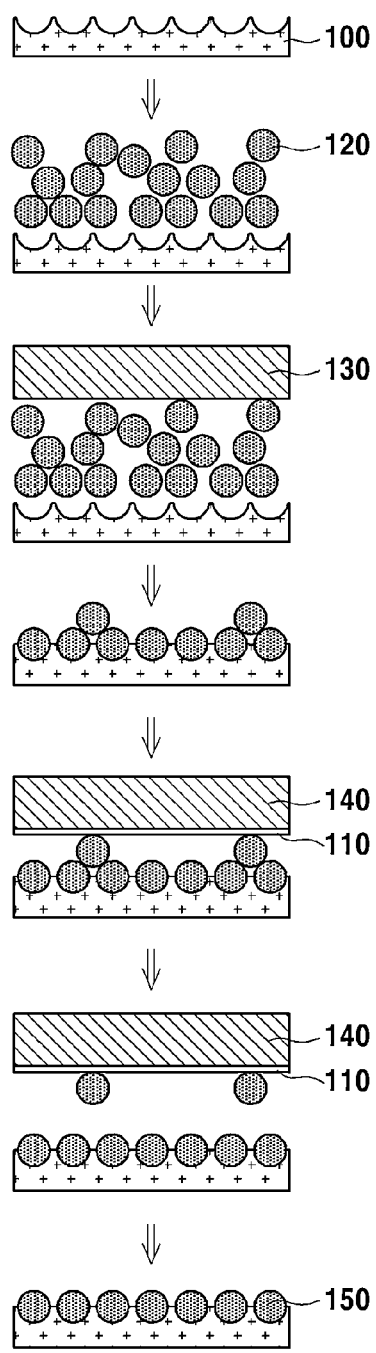
FIG. 2 is a process diagram for explanation of a method for forming a particle alignment layer on a first substrate in accordance with an illustrative embodiment of the present disclosure.

FIG. 2 is a process view for explanation of the step (S1) of forming a particle alignment layer on a first substrate. Unlike a conventional method for alignment of particles requiring use of a solvent and self-assembly as essential elements, the method for forming the particle alignment layer in the present disclosure is characterized by applying a physical pressure such as rubbing to particles to dispose the particles on the substrate. Accordingly, the present disclosure does not require accurate adjustment of a temperature or moisture for self-assembly of the particles in a solvent. Furthermore, since the particles are rapidly moved toward a desired direction on the surface of the substrate, the movement of the particles on the substrate is not affected by surface properties (e.g., a hydrophobic property, charge and roughness). In the case where a pattern is formed on a substrate, in the conventional technology using particles dispersed in a solvent, particles are not easily inserted into micropores formed by the pattern due to the capillary phenomenon of the solvent so that the insertion of the particles is irregular. In order to solve this problem, the present disclosure applies a physical pressure to the particles to insert the particles directly into the micropores. Accordingly, the present disclosure can insert the particles into all the pores. Furthermore, the particle alignment method of the present disclosure has larger tolerance for the size and the shape of the particles in the process of aligning the particles on the patterned substrate than that for the alignment by self-assembly.

In order to form the particle alignment layer on the first substrate, the first substrate is first prepared. If necessary, the first substrate 100 is coated with an adhesive material (non-illustrated). As the method for coating the first substrate with the adhesive material, any coating method, which is generally used in the art of the present disclosure, can be used. For example, the adhesive layer may be formed by deep coating or spin coating, but the present disclosure is not limited thereto. As the adhesive material for the formation of the adhesive layer, for example, polyethylene imine (PEI), polyacrylamide (PAM), poly-diallyldimethyl ammonium chloride (DADMAC), polyethylene oxide (PEO) and so on may be used, but the present disclosure is not limited thereto. The adhesive material enables the particles 120 to be adhered better on the first substrate 100. After the formation of the particle alignment layer on the first substrate, the adhesive layer may be removed prior to transferring the particle alignment layer onto the second substrate in order to facilitate the transfer of the particle alignment layer, but the present disclosure is not limited thereto. The method for removing the adhesive material is not specifically limited. In the case where the adhesive material such as polyethyerimide (PEI) is coated, the adhesive material may be removed by heating the substrate. For the same reason as described above, the method for producing a porous thin film having holes in accordance with the present disclosure may further include coating the surface of the second substrate with an adhesive material, prior to transferring the particle alignment layer onto the second substrate. However, the present disclosure is not limited thereto.

The particles to be aligned on the first substrate may be in a powder form, which is not dispersed in a solvent, or may be coated with, immersed or dispersed in a solvent with a volume ratio of about 0 to about 10 times, preferably about 0 to about 3 times with respect to the volume of the particles. Preferably, particles in a dried powder state, which is not dispersed in a solvent, may be used, or particles, which are coated with or immersed in a solvent such that the solvent can function as lubricating oil when a physical pressure is applied to the particles, may be used, but the present disclosure is not limited thereto.

The particles may be aligned on the first substrate through a physical pressure, e.g., rubbing or pressing against the substrate, but the present disclosure is not limited thereto. The rubbing means simply applying a physical pressure to the particles to form a physical or chemical bond between the particles and the substrate. The chemical bond may include a hydrogen bond, an ionic bond, a covalent bond, a coordinate bond, or a van der waals bond. Preferably, the chemical bond may include an ionic bond and a hydrogen bond. The rubbing may be performed by applying a pressure to the particles by using bare hands or hands wearing rubber gloves, or by applying a pressure to the particles by using a rubbing machine. Or, the rubbing may be performed by using a rubbing tool, preferably, by applying a pressure to the particles by using a first member 130, but the present disclosure is not limited thereto. The first substrate may be, for example, an elastic material in a geometrical form such as a natural or artificial rubber board, a plastic board and a PDMS board, a glass substrate, or a silicon wafer. However, the present disclosure is not limited thereto. If the rubbing is performed by using the first member, the particles can be aligned by performing reciprocation movement at least one time in a direction parallel with the first substrate in the state that a physical pressure is applied to the particles on the first substrate. Time for the rubbing is not specifically limited. However, if a monolayer of the particles is formed, the rubbing may be performed for 10 seconds to 180 seconds, preferably for about 30 seconds. However, the present disclosure is not limited thereto. Meanwhile, the method for producing a porous thin film having holes in accordance with the present disclosure may further include a step of removing the remaining particles that have not been randomly fixed by using a second member 140 having adhesiveness 110, after aligning the particles on the first substrate.

The particle alignment layer may include, but not limited to, a monolayer or a multilayer. After the formation of the particle alignment layer through the above-described method, the present disclosure may form a second monolayer by further including a process of putting a multiple number of particles on pores formed by at least three particles among the particles of the formed first monolayer, and then, inserting the particles into the pores through a physical pressure. By performing the process at least one time, a particle alignment multilayer having at least two layers of the particles can be formed. In the present disclosure, the particles of the second monolayer may be aligned upright on the particles of the first monolayer. However, the present disclosure is not limited thereto. When stacking, on the monolayer of the particles, another monolayer of the particles, the present disclosure may include further coating an adhesive layer, e.g., PEI, on a lower monolayer of the particles, prior to applying the physical pressure such as rubbing. However, the present disclosure is not limited thereto.

The size/shape/material for the particles forming the first monolayer may be identical to or different from those for the particles inserted into the second pores. That is, when the particles are aligned in a multilayer form having at least two layers, sizes/shapes/materials of the particles forming two adjacent layers may be identical to or different from each other. Also, when the particles are aligned in a multilayer form having at least two layers, patterns of two adjacent layers may be identical to or different from each other. By using the multilayer of the particles formed as described above, the particles of the multilayer can be simultaneously transferred onto the second substrate. Through the above-described method, the particle alignment layer 150 can be formed on the first substrate (refer to S1, FIG. 2, and (a) of FIG. 7).

Figure 3:
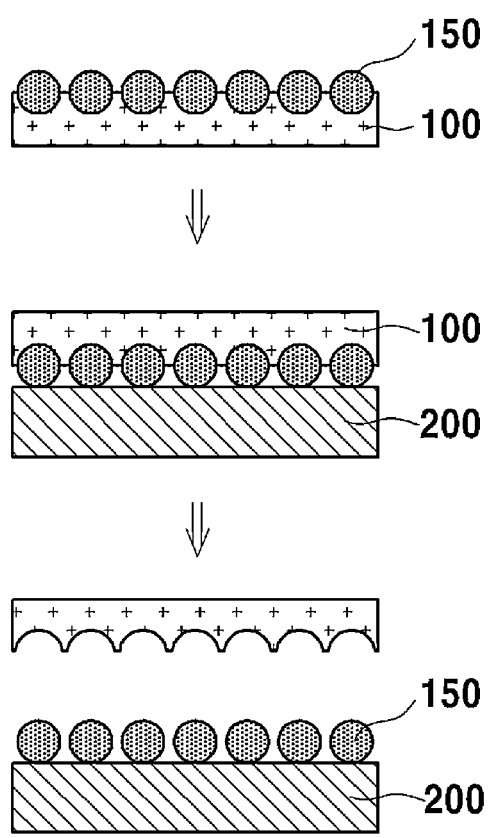
FIG. 3 is a process diagram for explanation of a method for transferring the particle alignment layer aligned on the first substrate onto a second substrate in accordance with an illustrative embodiment of the present disclosure.

FIG. 3 is a process diagram for explanation of the step (S2) of contacting the particle alignment layer aligned on the first substrate with the second substrate to transfer the particle alignment layer onto the second substrate. Prior to transferring the particle alignment layer 150 formed on the first substrate 100 onto the second substrate 200, in order to facilitate the transfer of the particle alignment layer, the adhesive material 110 may be removed, but the present disclosure is not limited thereto. The method for removing the adhesive material is not specifically limited. However, if the adhesive material such as polyetherimide (PEI) is coated, the adhesive material may be removed by heating the template substrate. In this case, a temperature and time for heating the template substrate may vary depending on the adhesive material used. If PEI is used, the heating may be performed at from 400° C. to 600° C., or 500° C. for one hour, but the present disclosure is not limited thereto. If the adhesive material is photoresist (PR), the photoresist may be removed, for example, by immersing the substrate coated with photoresist in a peeling solution or shower-injecting a peeling solution on the substrate, but the present disclosure is not limited thereto. An unlimited example for the peeling solution may include a strong alkali aqueous solution, dimethylformamide, dimethylacetoamide, dimethylsulfoxide, N-methyl-2-pyrrolidone, methalol and so on, but the present disclosure is not limited thereto.

In order to facilitate the transfer of the particle alignment layer formed on the first substrate 100 onto the second substrate 200, the present disclosure may further include coating the surface of the second substrate with an adhesive material, prior to transferring the particle alignment layer onto the second substrate, but the present disclosure is not limited thereto. As the first and second substrates, any substrates, which are generally used in the art of the present disclosure, can be used without limitation. For example, a glass, a fused silica wafer, a silicon wafer, or a substrate coated with photoresist may be used, but the present disclosure is not limited thereto (refer to S2, FIG. 3 and (b) of FIG. 7).

Figure 4:
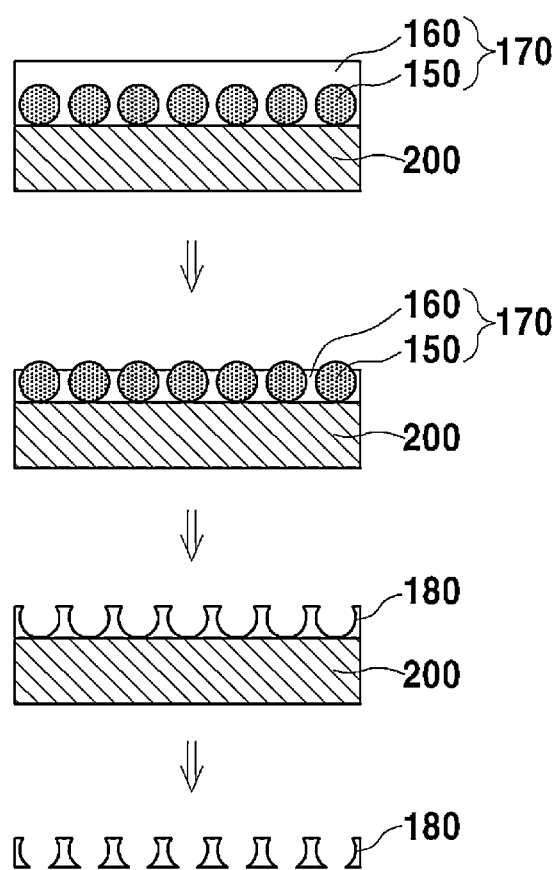
FIG. 4 is a process diagram for explanation of a method for forming a porous thin film having holes, by forming a particle-first thin film composite on the second substrate and removing the particles from the composite, in accordance with an illustrative embodiment of the present disclosure.
Figure 7:
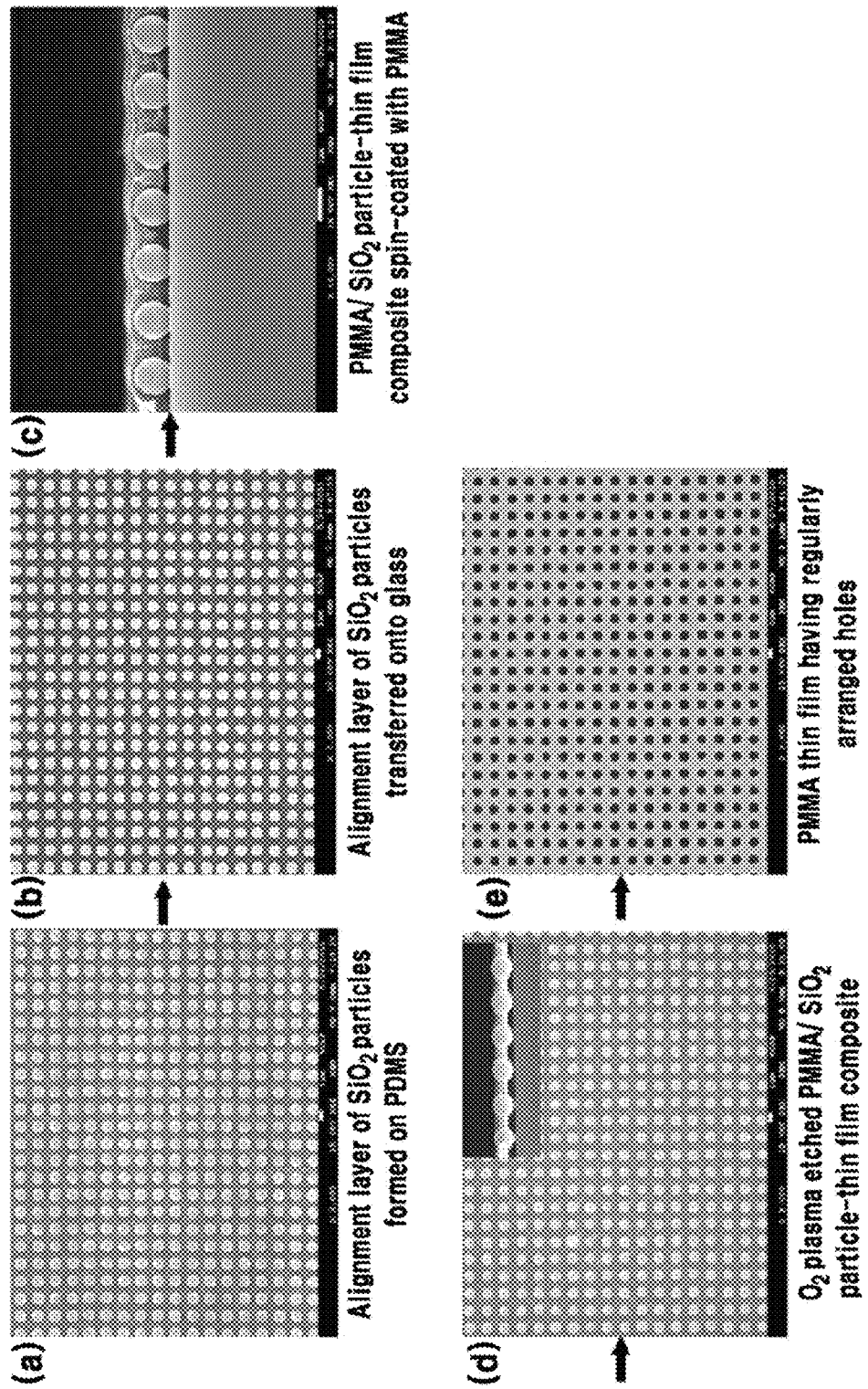
FIG. 7 shows SEM photographs by processes for producing a PMMA porous thin film having holes in accordance with an example of the present disclosure.

FIG. 4 is a process diagram for explanation of the step of coating the particle alignment layer transferred onto the second substrate with a first thin film formation material to form a particle-first thin film composite (refer to S3 and (c) of FIG. 7), and the step (S4) of removing part of the first thin film coated on the particle alignment layer to form a multiple number of holes, and then, remove the particles through the holes. The first thin film implies the particle alignment layer.

In order to form the first thin film 170, the particle alignment layer on the second substrate is coated with the first thin film formation material 160. As the coating method, any coating method, which is generally used in the art of the present disclosure, can be used. For example, the first thin film 170 may be formed through deep or spin coating by using the first thin film formation material 160, but the present disclosure is not limited thereto. The thin film may be selected from the group consisting of an organic thin film, an inorganic thin film, an organic-inorganic hybrid thin film and a combination thereof. For example, the organic thin film may include at least one selected from the group consisting of polystyrene, polymethylmethacrylate (PMMA), polyacrylate, polyalphamethylstylene, polybenzylmethacrylate, polyphenylmethacrylate, polydiphenylmethacrylate, polycyclohexylmethacrylate, stylene-acrylonitrile copolymer, and stylene-methylmethacrylate copolymer. However, the present disclosure is not limited thereto.

The step (S4) of removing part of the first thin film coated on the particle alignment layer to form a multiple number of holes, and then, removing the particles through the holes may include removing part of the first thin film from the particle-first thin film composite through etching to form a multiple number of holes ((d) of FIG. 7) thereby exposing part of each of the particles, and removing the exposed particles through the holes ((e) of FIG. 7). However, the present disclosure is not limited thereto. The method for etching the thin film may be an etching method, which is generally used in the art of the present disclosure, and can include dry etching and wet etching. For example, the thin film may be etched by using an etching solution capable of selectively removing the first thin film or through plasma etching (e.g., $O_2$ plasma etching, but the present disclosure is not limited thereto. Part of the thin film covering the particle alignment layer is etched by the above-described etching, such that the particles are exposed. Thereafter, the particles may be removed by the process described as follow. As the method for removing the particles, any method that can selectively remove only the particles can be used without limitation. For example, the particles may be removed by wet etching using an acid solution, but the present disclosure is not limited thereto. A porous thin film 180 having holes can be produced by the step (S4) of removing the particles from the particle-thin film composite 170 (refer to S4 and d) and e) of FIG. 7).

Prior to or after removing the particles in the formed thin film or the bottom part of the thin film, the present disclosure may further include separating the particle-first thin film composite formed by the coating with the thin film formation material or the porous thin film having holes from the second substrate. The separated particle-first thin film composite or porous thin film having holes may be transferred to a target substrate, if necessary. For example, the target substrate may be a support substrate having larger holes than the holes of the porous thin film. More specifically, the separated particle-first thin film composite or porous thin film having holes may be transferred onto a silicon wafer having larger holes than the holes of the porous thin film. However, the present disclosure is not limited thereto.

Hereinafter, one of illustrative embodiments of the present disclosure will be explained in more detail with reference to unlimited and exemplary examples. However, the present disclosure is not limited thereto.

MODE FOR CARRYING OUT THE INVENTION

Example 1

As the first substrate, a patterned polydimethylsiloxane (PDMS) substrate (pitch 700 nm) was used. As the particles, $SiO_2$ beads (650 nm) in a uniformed size were used. The $SiO_2$ beads (650 nm) in the uniformed size were aligned on the first substrate through rubbing so that a $SiO_2$ bead monolayer was formed.

As the second substrate, a glass substrate was used. After 0.6 wt % polyethyleneimide (PEI) as an adhesive material was spin-coated (rpm 3000, 20 s) on the second substrate, the $SiO_2$ bead monolayer was transferred onto the glass substrate. Thereafter, PMMA (2 g; molecular weight: 996,000), which is the thin film formation material, was added to toluene (50 g) and stirred at 60° C. to thoroughly dissolve PMMA so that a 4% PMMA solution was produced. After the solution was cooled to a room temperature, the $SiO_2$ bead monolayer on the glass substrate was immersed in the solution for 15 minutes. Thereafter, the $SiO_2$ bead monolayer on the glass substrate was taken out of the solution and spin-coated at a velocity of 3000 rpm for 20 seconds to coat the $SiO_2$ bead monolayer with PMMA so that a $SiO_2$ bead-PMMA thin film composite was formed.

The $SiO_2$ bead-PMMA thin film composite on the glass substrate that has been formed by the above-described processes was immersed in second distilled water for 20 minutes to separate the $SiO_2$ bead-PMMA thin film composite from the glass substrate. The $SiO_2$ bead-PMMA thin film composite was transferred onto a silicon wafer.

Figure 5:
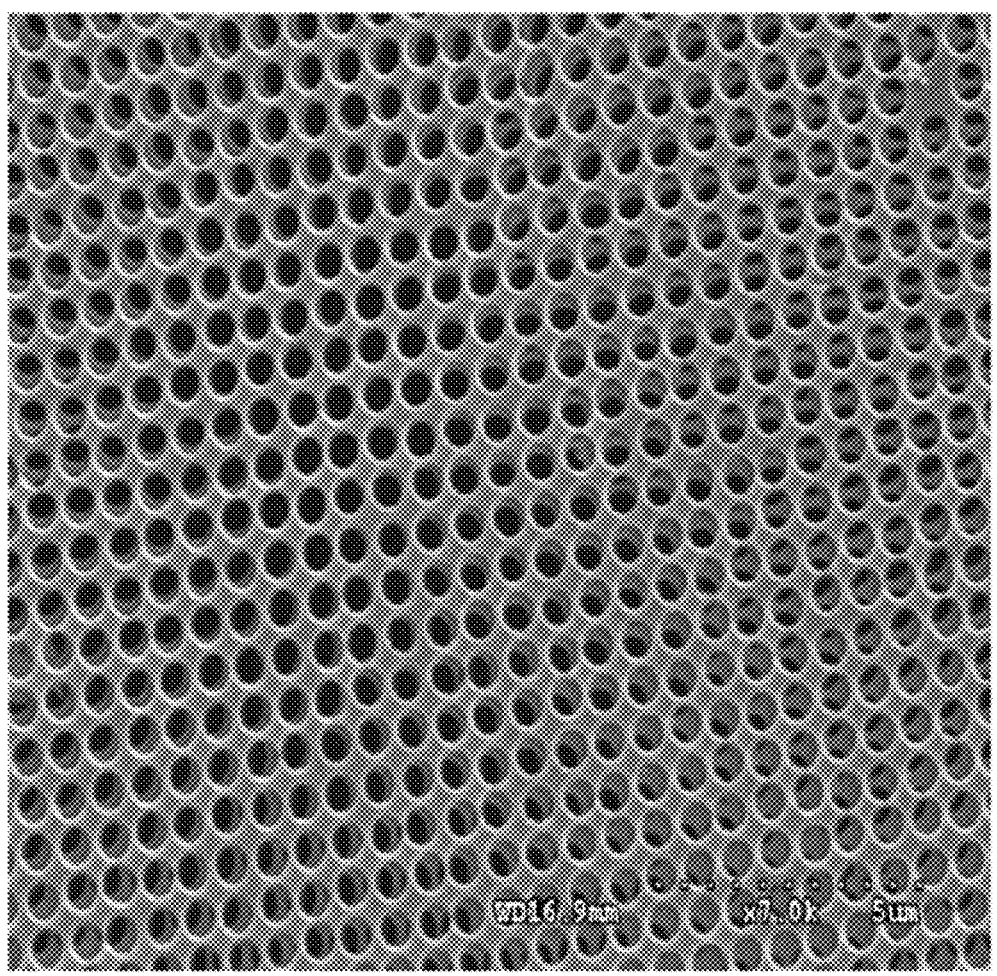
FIG. 5 is a scanning electron microscope (SEM) photograph of a PMMA porous thin film having holes produced in accordance with an example of the present disclosure.

After the $SiO_2$ bead-PMMA thin film composite on the silicon wafer was heated in an oven of 140° C. for one hour, part of the top part PMMA thin film of the $SiO_2$ bead-PMMA thin film composite was etched and removed by using $O_2$ plasma cleaner (HARRICK) for 5 minutes. After the etching, the $SiO_2$ bead-PMMA thin film composite was put in a 5% HF solution for 4 seconds to remove the $SiO_2$ beads. Thereafter, the composite was washed with second distilled water and dried so that a porous PMMA thin film having holes was formed. FIG. 5 shows a SEM photograph of the porous PMMA thin film having holes.

Example 2

Figure 6:
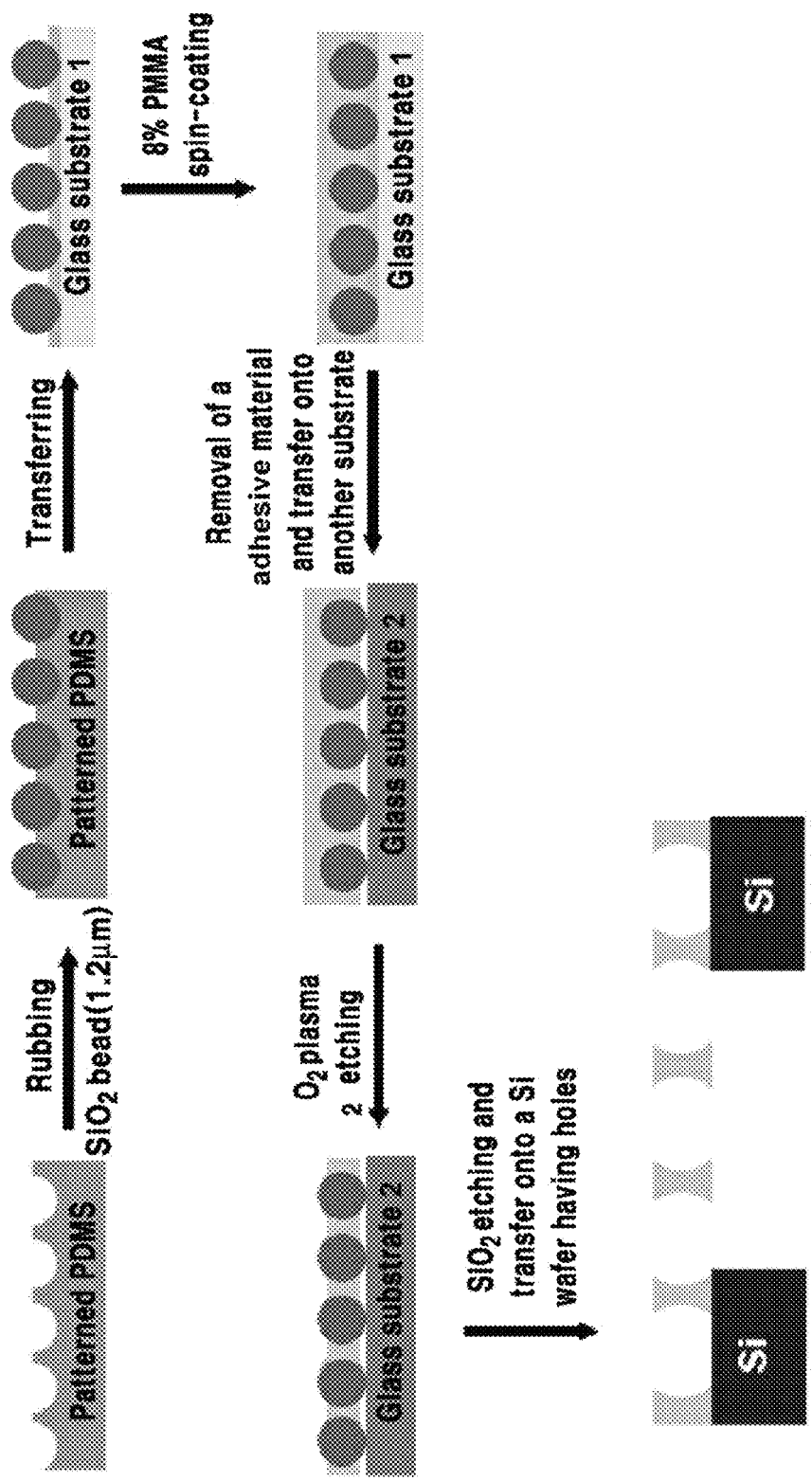
FIG. 6 is a process chart for explanation of a method for producing a PMMA porous thin film having holes in accordance with an example of the present disclosure.

A porous PMMA thin film having the holes was produced by the processes illustrated in FIG. 6.

First, a $SiO_2$ bead monolayer as a particle layer was formed on a semispherically patterned polydimethylsiloxane (PDMS) as the first substrate, by using $SiO_2$ beads (1.2 μm) in a uniformed size through rubbing. After 0.6 wt % PEI as an adhesive material was spin-coated (rpm 3000, 20 s) on a glass substrate, which is the second substrate, the $SiO_2$ bead monolayer was transferred onto the glass substrate. Thereafter, PMMA (2 g, molecular weight: 996,000) as the thin film formation material was added to toluene (50 g) and stirred at 60° C. (8% PMMA solution) to thoroughly dissolve the PMMA. After the solution was cooled to a room temperature, the $SiO_2$ bead monolayer on the glass substrate was immersed in the solution for 15 minutes. Thereafter, the $SiO_2$ bead monolayer on the glass substrate was taken out of the solution and spin-coated at a velocity of 3000 rpm for 20 seconds so that a $SiO_2$ bead monolayer coated with 8% PMMA was produced.

The $SiO_2$ bead-PMMA thin film composite on the glass substrate that has been formed by the above-described processes was immersed in second distilled water for 20 minutes to separate the $SiO_2$ bead-PMMA thin film composite from the glass substrate. The $SiO_2$ bead-PMMA thin film composite was transferred onto another glass substrate.

Figure 8:
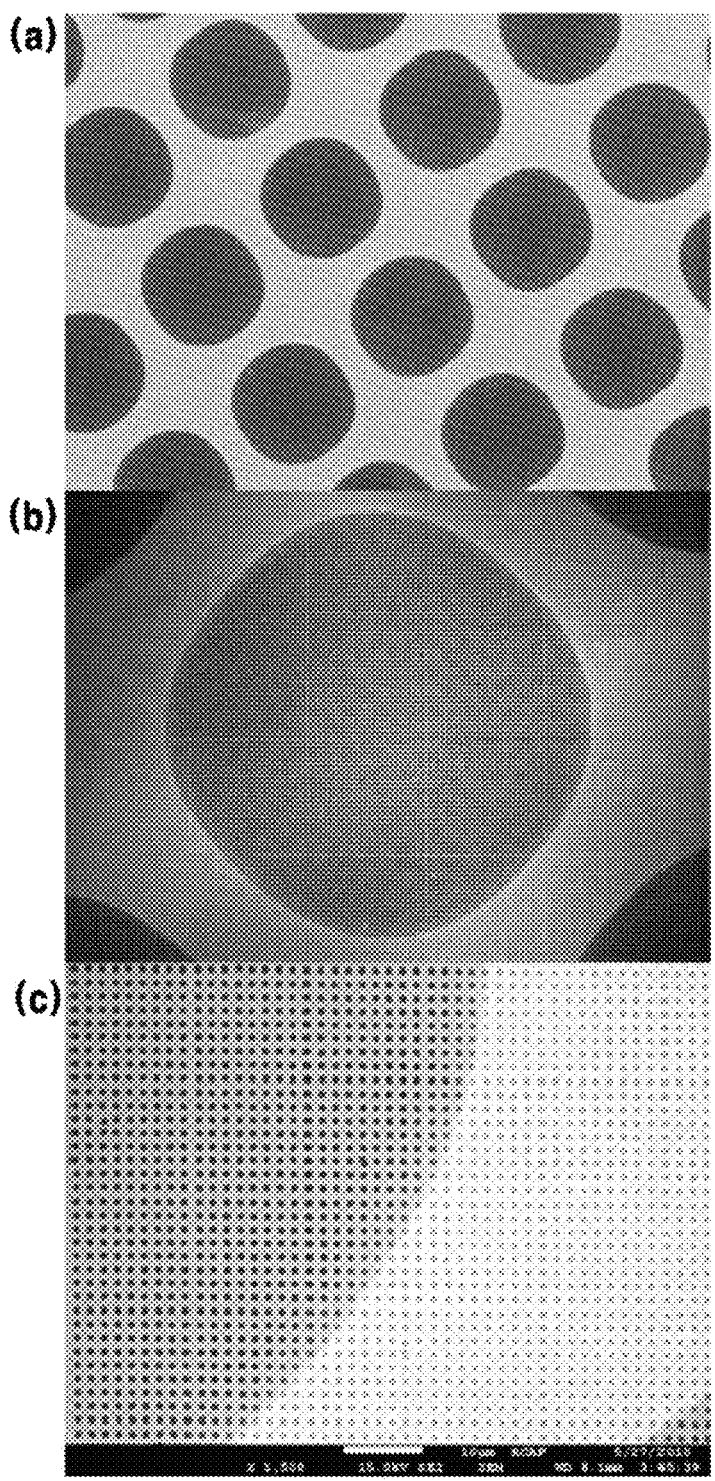
FIG. 8 shows SEM photographs of a PMMA porous thin film having holes, which has been transferred onto a silicon wafer having holes, in accordance with an example of the present disclosure.

After the $SiO_2$ bead-PMMA thin film composite on the glass substrate was heated at an oven of 140° C. for 1 hour, part of the PMMA thin film was etched by using a $O_2$ plasma cleaner (HARRICK) for 5 minutes. After the etching, the $SiO_2$ bead-PMMA thin film composite was put in a 5% HF solution for 4 seconds, washed with second distilled water and then dried to remove the $SiO_2$ beads so that a PMMA thin film having holes was produced. FIG. 7 shows SEM photographs of the $SiO_2$ bead monolayer, the $SiO_2$ bead-PMMA thin film composite, and the PMMA thin film having holes, which were formed in the above-described production processes. The PMMA thin film having holes was transferred onto a silicon wafer having holes and observed by a scanning electron microscope (SEM) (FIG. 8).

In FIG. 8*a*, the light portion indicates a silicon wafer, and the dark portion indicates holes on the silicon wafer. FIG. 8*b* shows enlarged views of the holes on the silicon wafer. It was observed that the porous thin film having holes formed by the production method of the present disclosure was transferred onto the holes of the silicon wafer. FIG. 8*c* shows further enlarged photographs of the hole areas of the silicon wafer. From the photograph, the porous thin film having regularly aligned holes was observed.

Example 3

Figure 9:
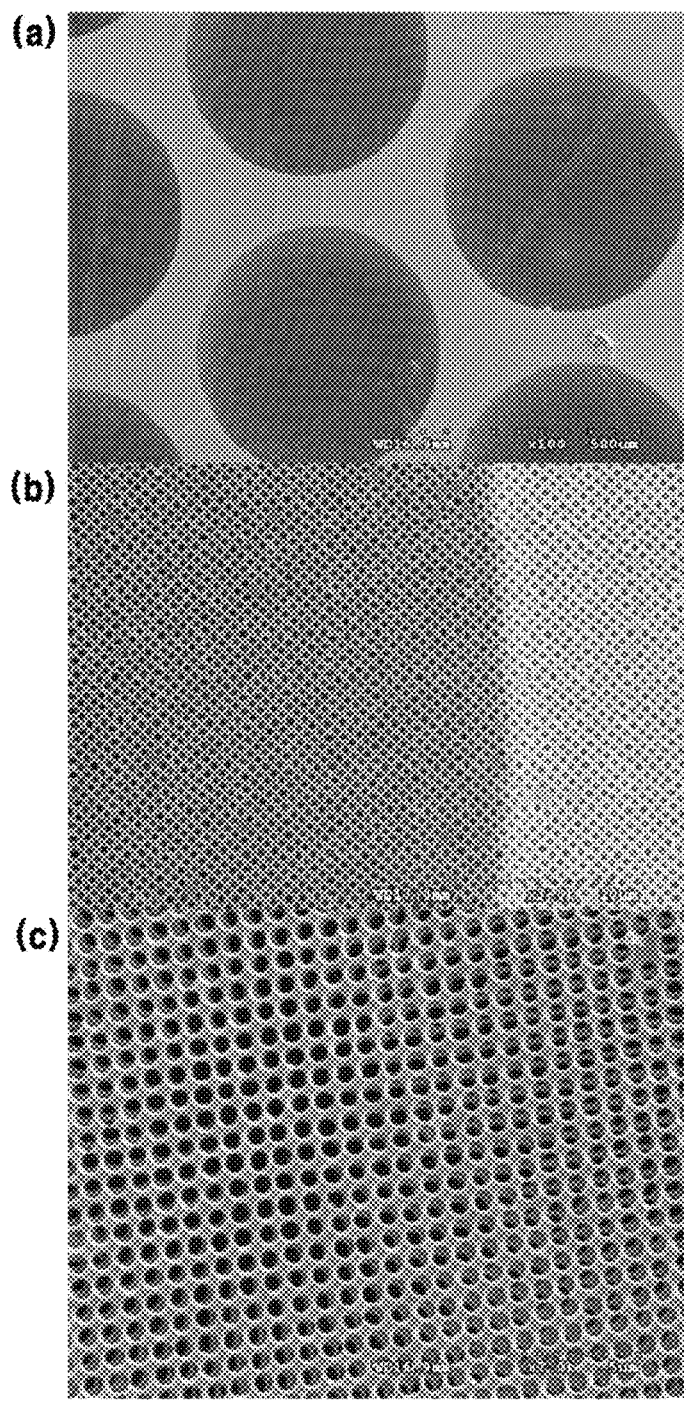
FIG. 9 shows SEM photographs of a polystyrene porous thin film having holes, which has been transferred onto a silicon wafer having holes, in accordance with an example of the present disclosure.

A polystyrene thin film having holes was produced by the same processes as those in Example 2, except for using polystyrene as the thin film formation material, instead of PMMA. The polystyrene thin film having holes was transferred onto a silicon wafer having holes and observed by using a scanning electron microscope (SEM) (FIG. 9). In FIG. 9*a*, the light portion indicates a silicon wafer, and the dark portion indicates the holes on the silicon wafer. FIG. 9*b* shows enlarged views of the holes on the silicon wafer. It was observed that the thin film having holes formed by the production process of the present disclosure was formed on the holes of the silicon wafer. FIG. 9*c* shows further enlarged photographs of the hole areas of the silicon wafer. From the photograph, the thin film having regularly aligned holes was observed.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A method for producing a porous thin film having holes, comprising:
    forming a particle alignment layer on a first substrate;
    contacting the first substrate, on which the particle alignment layer is formed, with a second substrate to transfer the particle alignment layer onto the second substrate;
    coating the particle alignment layer transferred onto the second substrate with a first thin film formation material to form a particle-first thin film composite; and
    removing part of the coated first thin film in the particle-first thin film composite to form a plurality of holes, and then, remove the particles through the holes.

2. The method of claim 1,
    wherein the step of removing the particles includes:
    etching part of the first thin film to form a plurality of holes thereby exposing part of each of the particles through the holes; and
    removing the exposed particles through the holes.

3. The method of claim 1,
    wherein the particle alignment layer includes a monolayer or a multilayer of the particles.

4. The method of claim 1,
    wherein the first substrate has a pattern of a first intaglio or a first relief formed on a surface thereof.

5. The method of claim 4,
    wherein the step of forming the particle alignment layer on the first substrate comprises putting a plurality of particles on the first substrate, and then, inserting parts or all of the particles into pores formed by the first intaglio or the first relief through a physical pressure so as to form the particle alignment layer on the first substrate.

6. The method of claim 5, wherein the physical pressure is applied by rubbing or pressing against the substrate.

7. The method of claim 4, wherein the pores formed by the first intaglio or relief formed on the first substrate have a shape corresponding to a shape of certain parts of the particles inserted into the pores for adjustment of the orientation of the particles.

8. The method of claim 1, further comprising forming an adhesive layer on a surface of the second substrate, prior to contacting the first substrate with the second substrate.

9. The method of claim 1, further comprising separating the formed porous thin film having holes from the second substrate.

10. The method of claim 9, further comprising transferring the porous thin film having holes that has been separated from the second substrate onto a support substrate having larger holes than the holes of the porous thin film.

11. The method of claim 1, wherein the particles are selected from the group consisting of an organic polymer, an inorganic polymer, an inorganic material, a metal, a magnetic material, a semiconductor, a biomaterial, and a combination thereof.

12. The method of claim 1, wherein the particles comprise porous or non-porous particles.

13. The method of claim 1, further comprising forming a plurality of porous thin films by repeating the steps of the method, and then, stacking the thin films to form a porous multilayer thin film.

* * * * *

UNITED STATES PATENT AND TRADEMARK OFFICE
CERTIFICATE OF CORRECTION

PATENT NO. : 8,753,526 B2  Page 1 of 1
APPLICATION NO. : 13/817578
DATED : June 17, 2014
INVENTOR(S) : Kyung Byung Yoon et al.

It is certified that error appears in the above-identified patent and that said Letters Patent is hereby corrected as shown below:

In the Specification,

Column 6, line 1, please add - 10 - between "or" and "nm"

Signed and Sealed this
Twenty-first Day of October, 2014

Michelle K. Lee
*Deputy Director of the United States Patent and Trademark Office*